Jan. 18, 1966  M. T. DERBY  3,229,743
SHEET METAL NUT WITH YIELDING RETAINER
Filed May 4, 1964
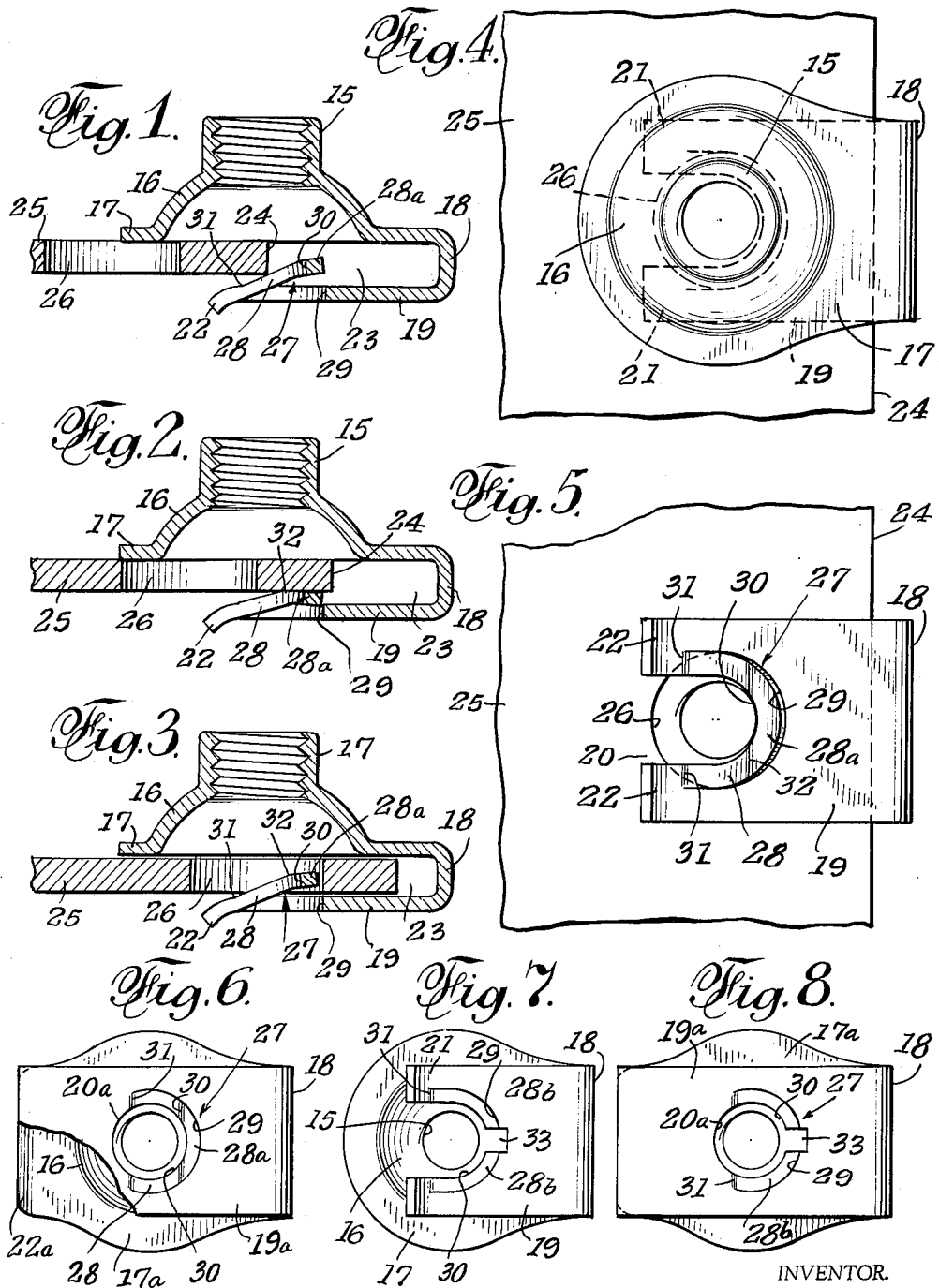
INVENTOR.
MARSHALL T. DERBY
BY C. G. Stratton
ATTORNEY United States Patent Office
3,229,743
Patented Jan. 18, 1966

3,229,743
SHEET METAL NUT WITH YIELDING RETAINER
Marshall T. Derby, Downey, Calif., assignor to California Industrial Products, Inc., South Gate, Calif., a corporation of California
Filed May 4, 1964, Ser. No. 364,475
2 Claims. (Cl. 151—41.75)

This invention relates to a sheet metal nut with means for retaining the same in operative position on a panel preparatory to securing said panel in place by a screw applied to the nut.

The conventional sheet metal nut, whether of the J or U shape, on the resilient retainer leg thereof is provided with an unyielding projection that, by entering in a hole in a panel, retains the nut captive on said panel. Such a stiff, unyielding projection requires spreading of the retainer leg of the nut a distance greater than is necessary for effecting installation of the nut on a panel. Moreover, such a projection, usually having a sharp edge on the side thereof toward the panel, mars the latter by scoring the same to material depths. Thus, present sheet metal nuts are faulty with respect to the necessity of placing high force and strain on the nuts when applying the same, equally great force and strain when removing such a nut from its installed position, if such becomes necessary, and forming undesired grooves or scores in the face of a panel along which the projection moves. Since sheet metal nuts are ordinarily made of steel and the panels to which they are applied are of softer metal, as aluminum or an alloy thereof, a panel may become substantially damaged, particularly in the lesser thicknesses.

Recognizing the foregoing, it is an object of the present invention to provide a sheet metal nut in which the retainer means on the retainer leg of the nut is resilient independently of the resilience of the retainer leg so that the same has a flexible engagement with a panel to which the nut is being applied.

Another object of the invention is to provide a sheet metal nut, as above characterized, in which the retainer means has greater flexibility than does the retainer leg, thereby lessening the force required for installing the nut on the panel.

A further object of the invention is to provide a sheet metal nut that, due to its flexible retaining means, may be installed on a wider range of panel thicknesses than has been possible with unyielding retainer means.

A still further object of the invention is to provide a sheet metal nut, as above mentioned that has a deeper engagement in a panel hole than has been possible with nuts having unyielding retainer means.

This invention also has for its objects to provide such means that are positive in operation, convenient in use, easily installed in a working position and easily disconnected therefrom economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, preferred embodiments of the present invention, which are given by way of illustration or example only.

In the drawing, like reference characters designate similar parts in the several views.

FIG. 1 is a longitudinal sectional view of a sheet metal J-nut showing one form of retainer means, the nut being shown with relation to an edge of a panel onto which it is about to be installed.

FIG. 2 is a similar view of said nut, showing an intermediate step during its installation on said panel.

FIG. 3 is a longitudinal sectional view of said J-nut in installed position on the panel.

FIG. 4 is a top plan view of the nut and panel, as in FIG. 3.

FIG. 5 is a bottom plan view.

FIGS. 6, 7 and 8 are bottom plan views of modifications, FIG. 7 showing a modified J-nut and FIGS. 6 and 8 showing the invention as provided on a U-nut.

The present nut is of bifurcated form whether of J or U shape or form.

The J-nut that is illustrated in FIGS. 1 to 5 and 7 is formed of single-thickness sheet metal and is shown as having an internally threaded collar 15 that forms an extension of a frusto-conical portion 16 that is drawn from a base plate 17. A connecting bend 18 connects said plate 17, along one edge, to a retainer plate or leg 19 that, because it is shorter than the base plate 17, provides the nut with a J shape. A bifurcation 20 is formed in the free end of the retainer leg, the same defining leg extensions 21, the ends 22 of which are bent or curled in a direction away from the plate 17.

The normal, relaxed position of the retainer leg 19, as in FIG. 1, shows said leg parallel to the plate 17, thereby forming a space 23 that is uniform between said plate 17 and the leg 19.

The above-described J-nut, or one similar thereto, is adapted to be slid over the edge 24 of a panel 25 which, as will become clear, has a maximum thickness less than the dimension of space 23 between plate 17 and leg 19. A hole 26 is provided in the panel 25, the same being of a size to loosely accommodate the shank of a screw inserted from the side of the retainer leg and entered into the threads of the collar 15. Such screws connect the nut to a mounting member and said screw, when drawn up tight in said collar, deforms the conical portion 16, by causing the same to flatten, to effect a tightly locked connection between the nut and the screw which strongly resists loosening of the screw. The foregoing forms no part of the present invention, but sets the environment of and the relationship desired between the nut and the panel 25.

According to the invention, the retainer leg 19 is provided with resilient retainer means 27 that, in FIGS. 1, 2 and 3, is shown as an approximately semicircular or half-ring sheared portion 28, the line of shear 29 of which preferably, but not necessarily, is parallel to the inner curvature 30 of the bifurcation 20. As shown in FIG. 1, said portion 28 slopes or is angularly offset from integral hinges 31 on the leg extensions 21, outwardly toward the connecting bend 18, and inwardly toward the plate 17.

As shown in FIGS. 1, 2 and 3, the part 28a of the half-round portion 28 that is farthest from the hinges 31, is bent as at 32 so that said part 28a will assume a generally parallel relationship to the leg 19 when the portion 28 is forced by the panel 25 in that direction during application of the nut to the panel.

The sum of the widths of hinges 31 is substantially less than the width of the connecting bend 18. As a consequence, when the panel 25, from the position of FIG. 1, is moved into the space 23 toward the bend 18, the plate edge 24 will encounter the sloping portion 28 and force the same back toward the leg 19, as in FIG. 2. A panel 25 of maximum thickness is illustrated, but thinner panels will engage the nut in the manner above described.

It will be understood that the space 23 has a width between the plates 17 and 19 that is approximately equal to the maximum thickness of panel 25, plus the thickness of the part 28a of the resilient nut-retaining portion 28. While some minimal outward flexure of the plate or leg 19 may be tolerated, the invention contemplates operative flexure of the portion 28a only to the point where it cannot flatten further due to its encounter with the edge of leg 19 that is defined by the shear line 29. This condition is shown in FIG. 2.

As the nut is moved further onto the edge 24 of the panel the outer curvature of the bend 32 enables said edge to smoothly pass over the bend and cause the portion 28 to flex on the hinges 31 and the part 28a to achieve a generally flat engagement with the bottom face of panel 25, being pressed by said panel to its maximum retraction against the shear edge 29.

As assembly of the nut onto the panel 25 is continued, the hole 26 in said panel will achieve registry with the outer peripheral edge of the half-ring portion 28. The latter will automatically snap back into the hole 26, as shown in FIG. 3, effecting connection of the nut onto the panel. It will be evident that an accurate fit of the portion 28 in the hole 26 is not required. A substantial amount of displacement between the nut and hole 26 may be tolerated since a screw, applied as above indicated, will encounter the inner surface of the conical portion 16 and effect an automatic centering of the screw and nut.

The sheet metal nut shown in FIG. 6 is a U-nut which is similar to the J-nut above described, except that the retainer leg 19a is longer than the leg 19, the hole 20a replaces the bifurcation 20, and the plate 17a is provided with an upturned end 32 which has the same lead-in purpose for the panel edge 24 as have the bent ends 22. In other respects, the construction follows the J-nut above described. It will be noted that the hinges 31 may be placed so that the half-ring 28 is, in fact, somewhat more than half a ring, thereby increasing the length and, therefore, the flexibility of said portion 28. This portion 28 may be provided with a bent part 28a as described in connection with the invention as shown in FIGS. 1–5.

Another way of assuring independent flexure of the retainer portion is shown in FIGS. 7 and 8. The J-nut shown in FIG. 7 is the same as the one shown in FIGS. 1 to 5 except that the half-ring portion 28 is divided into two opposite arcuate arms 28b by removing a middle portion of the half-ring as at 33. The same modification is shown on the U-nut of FIG. 8. These flexible arcuate arms 28b move freely into and out of coplanar engagement with the legs 19 or 19a, as the case may be.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. In a sheet metal nut having a bifurcated shape with a plate part provided with a threaded collar, a retainer leg having an opening for passage of a screw to engage the threads of the collar, and a bend connecting said plate part and leg, and adapted for being mounted on a panel having a hole therein by being slid over an edge of the panel adjacent said hole with the plate part engaged with one side of the panel and the retainer leg with the opposite side, (a) flexible retainer means sheared from said retainer leg and bent inwardly toward the mentioned plate part, said retainer means being engaged and flexed by the panel toward the plane of the retainer leg during mounting movement of the nut and, when achieving register with the hole in the panel, automatically flexing back to its inwardly bent position and into said panel hole, thereby effecting securement of said nut to the panel, (b) said retainer means comprising an approximately semi-circular portion having integral hinge connections with said retainer leg and partly around said opening in said leg, said semi-circular portion being provided with a bent part that is substantially centrally disposed between the hinge connections, (c) the retainer leg having a shear edge that is exposed when the retainer means is sheared and bent inwardly toward the plate part, (d) the hinge connections being on the side of the opening in the retainer leg and closer to the free end of the retainer leg, (e) the mentioned semi-circular portion extending from the hinge connections in the direction of the bend that connects the plate part and the retainer leg, and (f) the bent part on the semi-circular portion being at an angle opposite to the angle of the resilient portion, such that said part is substantially parallel to the retainer leg when the semi-circular portion of the retainer means abuts said sheared edge.

2. In a sheet metal nut having a bifurcated shape with a plate part provided with a threaded collar, a retainer leg having an opening for passage of a screw to engage the threads of the collar, and a bend connecting said plate part and leg, and adapted for being mounted on a panel having a hole therein by being slid over an edge of the panel adjacent said hole with the plate part engaged with one side of the panel and the retainer leg with the opposite side, (a) flexible retainer means formed from said retainer leg and bent inwardly toward the mentioned plate part, said retainer means being engaged and flexed by the panel toward the plane of the retainer leg during mounting movement of the nut and, when achieving register with the hole in the panel, automatically flexing back to its inwardly bent position and into said panel hole, thereby effecting securement of said nut to the panel, (b) said retainer means comprising an approximately semi-circular portion having integral hinge connections with said retainer leg and partly around said opening in said leg, said semi-circular portion being provided with a bent part that is substantially centrally disposed between the hinge connections, (c) the retainer leg having a curved edge conforming in shape to the outer curvature of the retainer means, (d) the hinge connections being on the side of the opening in the retainer leg and closer to the free end of the retainer leg, (e) the mentioned semi-circular portion extending from the hinge connections in the direction of the bend that connects the plate part and the retainer leg, and (f) the bent part on the semi-circular portion being at an angle opposite to the angle of the resilient portion, such that said part is substantially parallel to the retainer leg when the semi-circular portion of the retainer means abuts said curved conforming edge.

References Cited by the Examiner

UNITED STATES PATENTS

| | | | |
|---|---|---|---|
| 2,255,469 | 9/1941 | Kost | 151—41.75 |
| 2,258,845 | 10/1941 | Burke | 151—41.75 |
| 2,298,568 | 10/1942 | Kost | 151—41.75 |
| 2,672,905 | 3/1954 | Hartman et al. | 151—41.75 |
| 2,855,013 | 10/1958 | Lillard | 151—21 |
| 2,937,682 | 5/1960 | Patten | 151—41.75 |

EDWARD C. ALLEN, *Primary Examiner.*